（12）United States Patent
Hagdahl et al.

(10) Patent No.: US 11,030,134 B2
(45) Date of Patent: Jun. 8, 2021

(54) COMMUNICATION SYSTEM, A COMMUNICATION CONTROLLER AND A NODE AGENT FOR CONNECTION CONTROL BASED ON PERFORMANCE MONITORING

(71) Applicant: SAAB AB

(72) Inventors: Stefan Hagdahl, Stockholm (SE); Austin Mahoney, Ljungsbro (SE); Mikael Johansson, Ljungsbro (SE); Anders Gunnar, Upplands Vaesby (SE); Jayedur Rashid, Jaerfaella (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 16/489,483

(22) PCT Filed: Feb. 26, 2018

(86) PCT No.: PCT/SE2018/050181
§ 371 (c)(1),
(2) Date: Aug. 28, 2019

(87) PCT Pub. No.: WO2018/160121
PCT Pub. Date: Sep. 7, 2018

(65) Prior Publication Data
US 2020/0073834 A1 Mar. 5, 2020

(30) Foreign Application Priority Data
Mar. 2, 2017 (SE) .................................. 1750231-1

(51) Int. Cl.
*G06F 13/36* (2006.01)
*G06N 20/00* (2019.01)
(52) U.S. Cl.
CPC ............. *G06F 13/36* (2013.01); *G06N 20/00* (2019.01)

(58) Field of Classification Search
CPC ................................. G06F 13/36; G06N 20/00
See application file for complete search history.

(56) References Cited

U.S. PATENT DOCUMENTS 9,432,901 B1 * 8/2016 Kwan .................... H04L 41/147
9,483,742 B1   11/2016 Ahmed
(Continued)

FOREIGN PATENT DOCUMENTS

EP   0868060 A1   9/1998

OTHER PUBLICATIONS

Zheng, *Evaluating Machine Learning Models: A Beginner's Guide to Key Concepts and Pitfalls*, O'Reilly Media, Sep. 1, 2015, (59 pages). [Retrieved from the Internet Jul. 10, 2019] <http://docs.media.bitpipe.com/io_12x/io_127161/item_1221948/Evaluating%20ML%20Models.pdf>.

(Continued)

*Primary Examiner* — Tim T Vo
*Assistant Examiner* — Harry Z Wang
(74) *Attorney, Agent, or Firm* — Alston & Bird LLP

(57) ABSTRACT

A communication controller, a method and a node agent is disclosed, The communication controller comprising: a data transmission port configured to be connected to corresponding logical channels; an application port configured to provide data to or from corresponding applications; a node agent having node control data comprising at least one trained machine learning model, configured to: monitor performance characteristics for data inflow to a data transmission port; monitor an at least one local observable; control the connection between the data transmission port and another data transmission port causing outflow of data, or between the data transmission port and the application port, causing inflow of data if the application port receives data, and outflow of data if the application port sends data;

(Continued)

control the connection between the transmission ports and the application ports based on the monitored performance characteristics, the at least one local observable, the at least one trained machine learning model and a local policy matrix.

17 Claims, 5 Drawing Sheets

(56) References Cited

U.S. PATENT DOCUMENTS

| | | | |
|---|---|---|---|
| 2015/0195192 A1 | 7/2015 | Vasseur et al. | |
| 2016/0028616 A1* | 1/2016 | Vasseur | H04L 47/50 370/412 |
| 2016/0218949 A1 | 7/2016 | Dasgupta et al. | |
| 2017/0026888 A1 | 1/2017 | Kwan | |
| 2017/0279838 A1* | 9/2017 | Dasgupta | H04L 63/145 |

OTHER PUBLICATIONS

Tamvaclis, *QOS Driven Routing in Packet Switched Networks of Multiple Transmission Media*, Advisory Group for Aerospace Research & Development, ISSN 0549-7191, Oct. 4, 1993, (9 pages), The Netherlands.

The Swedish Patent and Registration Office, Swedish Search Report for Sweden Patent Application No. 1750231-1, Mar. 2, 2017, (2 pages), Sweden.

International Searching Authority, International Search Report and Written Opinion for International Application No. PCT/SE2018/050181, dated May 2, 2018, The Swedish Patent and Registration Office, (17 pages), Sweden.

International Preliminary Examining Authority, International Preliminary Report on Patentability for International Application No. PCT/SE2018/050181, dated May 28, 2019, The Swedish Patent and Registration Office, (12 pages), Sweden.

European Patent Office, Extended European Search Report received for Application No. 18761056.3, dated Dec. 14, 2020, 10 pages, Germany.

* cited by examiner (Prior-Art)

(Prior-art)

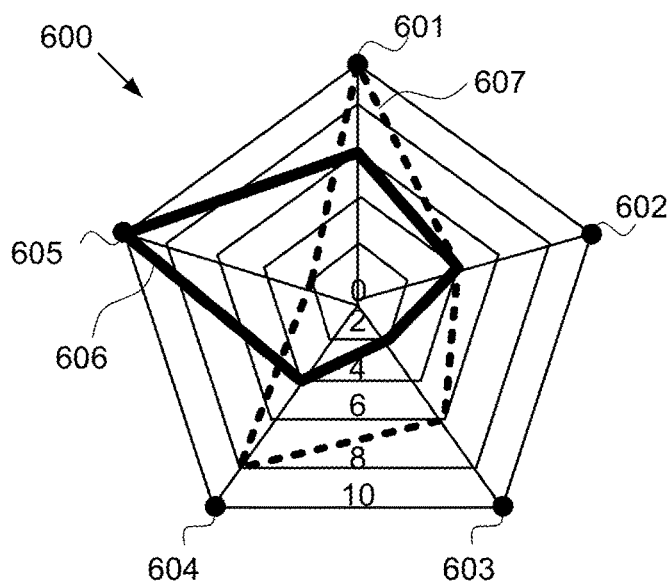
FIG. 6
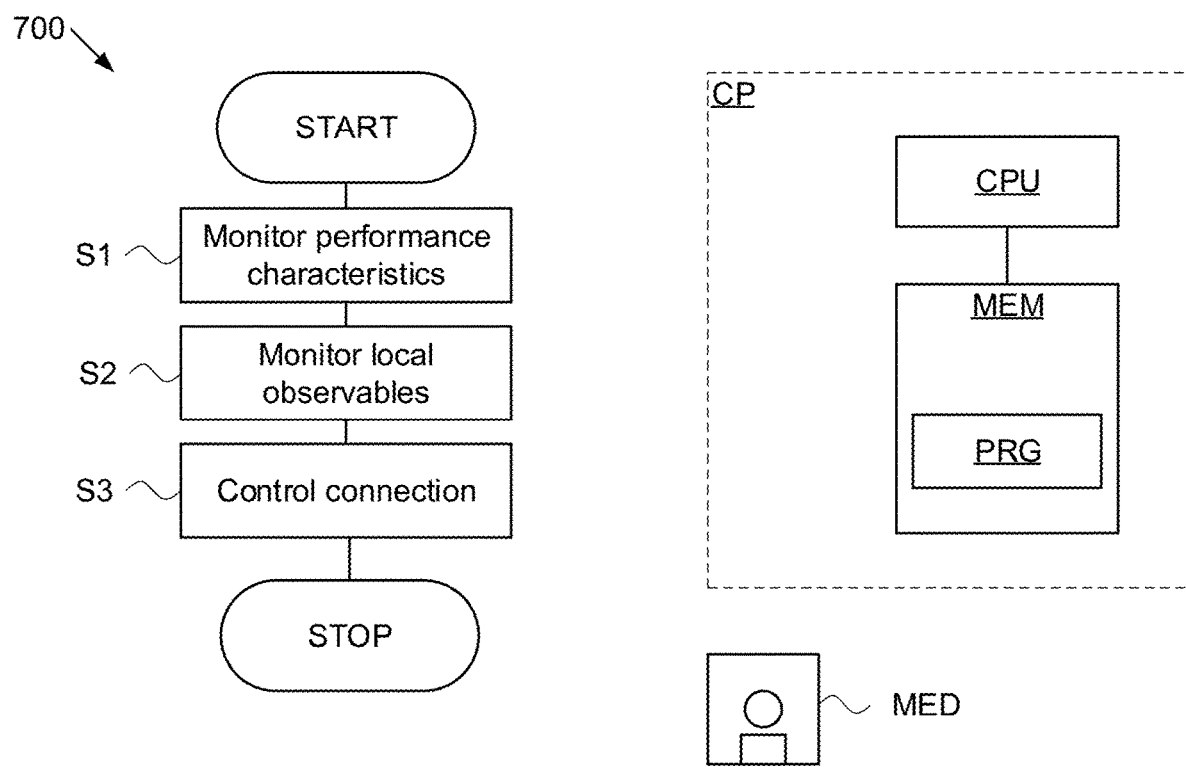
FIG. 7
FIG. 8

COMMUNICATION SYSTEM, A COMMUNICATION CONTROLLER AND A NODE AGENT FOR CONNECTION CONTROL BASED ON PERFORMANCE MONITORING

CROSS REFERENCE TO RELATED APPLICATIONS

This application is a National Stage Application, filed under 35 U.S.C. § 371, of International Application No. PCT/SE2018/050181, filed Feb. 26, 2018, which claims priority to Swedish Application No. 1750231-1, filed Mar. 2, 2017; the contents of both of which are hereby incorporated by reference in their entirety.

BACKGROUND

Related Field

The present invention generally relates to the field of telecommunication, and more specifically to a communication controller and a method therefor.

Description of Related Art

In FIG. 1 a traditional communication network is shown. The communication is based on a central node with an antenna. All communications between nodes are routed via the central node.

In traditional telecommunication systems different communication devices were dedicated to specific communication types, see FIG. 2 in which a traditional telecommunication system is disclosed. For example a VHF radio link R1 is used for voice communication, and a microwave link R2 is used for video transmission. Furthermore, another radio link R3 is used for telemetry transmission.

If any of the links R1, R2, R3 experiences communication errors due to disturbances, such as for example jamming or atmospheric conditions, the communication may be interrupted. This way, the communication for certain applications is stopped or disturbed.

Thus, it exits a need for a more robust and reliable communication network.

BRIEF SUMMARY

In general the present invention provides a solution to the above problem by means of a communication controller that controls the use of network resources according to a local policy matrix and under influence of at least one local observable.

More particularly, according to the present invention, a communication controller, comprising: at least one data transmission port configured to be connected to corresponding logical channels, at least one application port configured to provide data to or from corresponding applications, a node agent having node control data comprising at least one trained machine learning model, the node agent being configured to: monitor performance characteristics for data inflow to a data transmission port; monitor local observables; control the connection between the data transmission port and another data transmission port causing outflow of data, or between the data transmission port and the application port, causing inflow of data if the application port receives data, and outflow of data if the application port sends data; control the connection between the transmission ports and the application ports based on the monitored performance characteristics and the local observable and the at least one trained machine learning model and a local policy matrix.

The at least one local observable may be at least one from the group: node permission change, net topology change, link quality change, node congestion change, traffic pattern change, jamming cyber-attacks, and instructions from operators and/or applications.

The node agent may further be configured to update the local policy matrix of the communication controller. This allows the node agent upon detection of a change in the aft least one local observable to change a communication profile.

The node agent is further configured to update the local policy matrix based on providing results from the monitoring of the at least one local observable and/or the performance characteristics into the at least one trained machine learning model whereby an output of the at least one trained machine learning model is generated by the node agent which is used by the node agent to update the local policy matrix.

The at least one trained machine learning model is trained off-line in a data processing environment disconnected from a network comprising the communication controller.

The at least one trained machine learning model is trained off-line based on using at least one machine learning algorithm, training data and a virtual network clone, wherein said virtual network clone is a software and/or emulated representation of the network.

The training of the at least one machine learning models further is based on the use of a global target function defining target for end to end application performance metrics in terms of performance for providing data to or from the corresponding applications of the communication controller via its data transmission port and the application port from or to corresponding applications of at least one different communication controller via its data transmission port and the application port and via any intermediaries.

The present invention also provides a method in a communication controller. The communication controller comprises: at least one data transmission port configured to be connected to corresponding logical channels; at least one application port configured to provide data to or from corresponding applications; the method comprising: controlling the connection between a data transmission port and: another data transmission port causing outflow of data; or an application port, causing inflow of data if the application port receives data, and outflow of data if the application port sends data; monitoring performance characteristics for data inflow to a data transmission port; monitoring a local observable; controlling the connection between the transmission ports and to the application ports based on the monitored performance characteristics and the local observables and at least one trained machine learning model and a local policy matrix.

The monitoring of the local observable may comprise monitoring at least one from the group of node permission change, net topology change, link quality change, node congestion change, traffic pattern change, jamming, cyber-attacks, information from all levels of network layers and OSI-layers, physical sensor data and instructions from operators and/or applications.

Generating the at least one trained machine learning model, used for controlling the connections, can be achieved by means of providing at least one machine learning algorithm, a virtual network clone (VNC), a global target function (GTF) and training data (TD) to a processing environment (PE), and executing the at least one machine learning algorithm, the virtual network clone and the global target function in the processing environment while providing the training data so as to cause the at least one machine learning algorithm generating the at least one trained machine learning model.

The features of the communication controller and the method of operation set out above enable a robust and reliable communication network. The features therefore solve the problem of providing a more robust and reliable network.

BRIEF DESCRIPTION OF THE FIGURES

Embodiments of the invention will now be explained in detail, by way of example only, with reference to the accompanying figures, in which:

FIG. 6 is a star diagram illustrating a node policy according to an embodiment of the present invention.

FIG. 7 is flow diagram illustrating an embodiment of a method according to the present invention.

FIG. 8 is a block diagram of a computer.

DETAILED DESCRIPTION OF VARIOUS EMBODIMENTS

As will be explained below, embodiments of the invention provide a flexible and adaptive communication system as well as a communication controller and a method.

Figure 1:
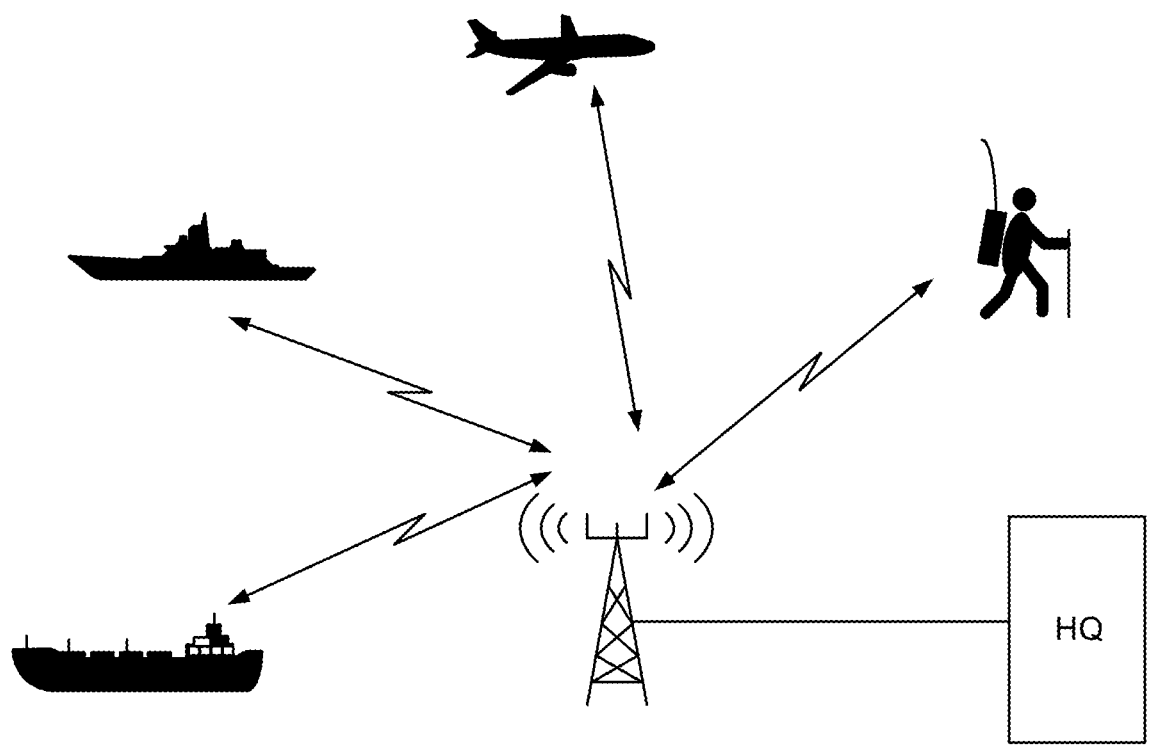
FIG. 1 is a schematic diagram of a prior-art communication network.
Figure 2:
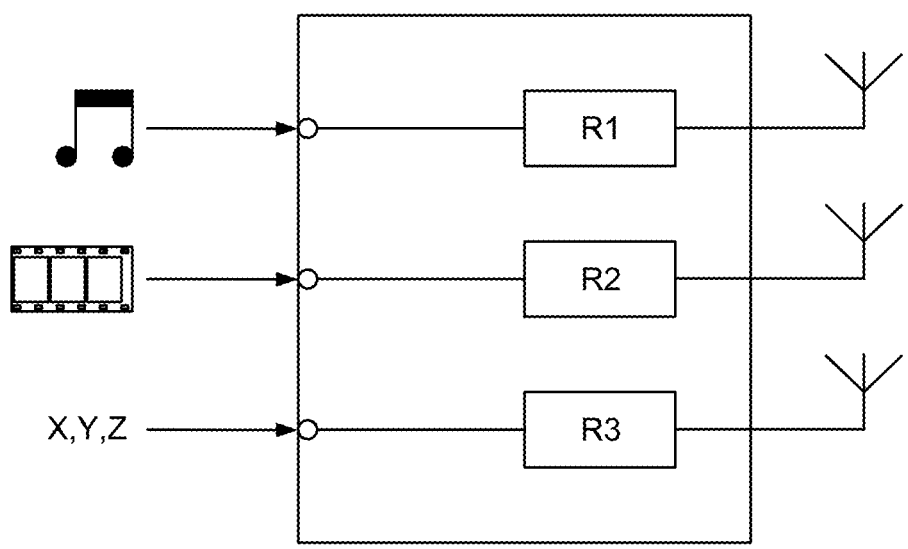
FIG. 2 is a schematic diagram of a prior-art communication system.
Figure 3:
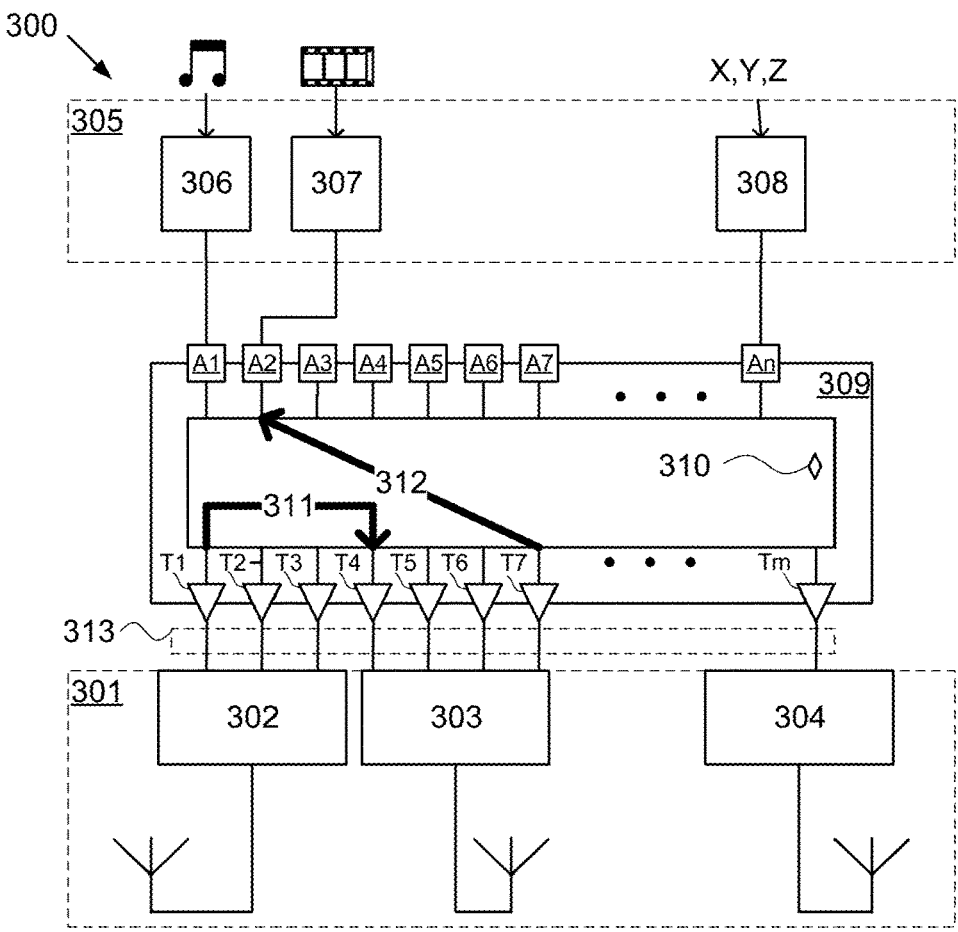
FIG. 3 is a schematic diagram of a communication system according to an embodiment of the present invention.

An embodiment of the invention will now be described with reference to FIG. 3. In which a communication system, generally designated 300, comprises a data transmission system 301 with a first radio transceiver 302, a second radio transceiver 303 and a third radio transceiver 304. The first radio transceiver 302 provides three logical channels over one physical channel for communication. The second radio transceiver 303 provides four logical channels over one physical channel for communication and the third radio transceiver provides a single logical channel over one physical channel. The channels may be different, routes, physical frequency intervals or digital channels in a digital radio of OFDM type for example. One of the radio transceiver may be a VHF transceiver and another transceiver may be a UHF transceiver, and yet another transceiver may be a SATCOM.

Furthermore, the communication system 300 comprises a number of applications, generally designated 305. Some exemplary applications are disclosed herein, for example a voice application 306, a video stream application 307 and a telemetry application 308. These applications 305 consume and/or produce data that will be transmitted or received by means of the data transmission system 301.

The control and selection of the data transmission system 301 is performed with a communication controller, generally designated 309. The communication controller 309 comprises a plurality of application ports A1-An. The application ports may act as buffers for data from corresponding applications 305, the application tags the data with a receiver of the data. The communication controller 309 further comprises a plurality of data transmission ports T1-Tm, each data transmission port is associated with a corresponding logical channel 313 of the data transmission system 301. For example the data transmission port T1 has a corresponding logical channel in the first radio transceiver 302. However, the logical channel of the data transmission system may also be enabled upon use of a data transmission port T1-Tm. This may be achieved with handshake functionality between the communication controller and the data transmission system.

If data flows in the path from the data transmission system 301 to the applications 305, the data flow is considered to be an inflow. If the data flows out from a data transmission port T1-Tm it is considered to be an outflow of data. In FIG. 3 an outflow of data is illustrated as path 311 that relays information from a data transmission port T1 to another data transmission port T4. An inflow of data is illustrated as a path 312 where information flows from the data transmission port T7 to an application port A2 to which a video application 307 is connected.

The paths 311, 312 are created by a node agent 310 of the communication controller 309. These paths are under control of the node agent 310 which controls the connections between the application ports A1-An and the data transmission ports T1-Tm.

The node agent 310 monitors the inflow of data to the communication controller 309 and determines at least one local observable derived from the inflow of data. This means that the monitoring does not create any extra network traffic. This may be especially useful if the communication system has entered a mode which involves radio silence/network silence. The local observable is at least one from the group of node permission change, net topology change, link quality change, node congestion change, traffic pattern change, jamming and cyber-attacks. Furthermore the node agent 310 has access to a node policy 600 which is discussed below with reference made to FIG. 6. The node policy indicates a desired characteristic for a specific type of application, for example bandwidth or delay. The node agent 310 further has access to a local policy matrix which relates the inflows and the outflows and the data transmission ports T1-Tm to characteristics of the data transmission ports. By means of this local policy matrix the node agent is able to select a path in line with the requirements set out by the node policy. In a dynamic scenario the local policy matrix may be changed/updated based on detection of certain events or local observables by the node agent. For example in a mission during transportation a first set of local policy settings may be used, which for example prioritize telemetry data, and during action another set of local policy settings in the matrix may be used which prioritize video streams. The trigger for changing policy settings may be telemetry data that indicates that the target is reached. The node agent is also configured to locally change and update the local policy matrix if some local observable is detected. An update of the local policy matrix might be suggested if a local observable indicate that the communication system is under heavy attack or jamming.

The at least one local observable may also comprise information from all levels of network layers and OSI-layers above. Additionally, the at least one local observable may include physical information such as weather conditions, Radio-Frequency environment (RF-environment) generated from various sources, and geographic data. The at least one local observable may also include physical sensor data and information from the node. The at least one local observable may also include instructions from operators and/or instructions from applications.

Furthermore, the node agent 310 comprises a hybrid intelligent system that acts upon local observables.

Within this application a hybrid intelligent system is a system comprising information and being configured to use said information wherein the information comprises one or more trained machine learning models generated by training of one or more machine learning models based on executing one or more machine learning algorithm such as one or more machine learning algorithms selected from any of or combinations of artificial intelligence, deep-learning, rule based decision systems, statistical models, decision trees, neural networks, evolutionary computations and genetic algorithms.

In more detail the hybrid intelligent system comprises information in the form of predetermined node agent control data configured to allow the node agent 310 to change and/or update the local policy matrix based on detection of certain events or changes of the at least one local observable and/or the performance characteristics.

The node agent control data is predetermined by means of being generated by executing the one or more machine learning algorithms while during its execution providing training data to the one or more machine learning algorithms for use as training data by the one or more machine learning algorithms. Following the completion of the execution machine learning algorithms one or more trained machine learning models are generated as an output of the execution. The one or more trained machine learning models are then arranged to be deployed to the communication controller in order to be used by the node agent of the communication controller 310 as node agent control data to allow the node agent to change and/or update the local policy matrix. Thus, the node agent control data comprises the at least one trained machine learning model.

The node agent control data in the form of the trained machine learning models are configured to be used by the node agent once deployed in the communication controller. In more detail the node agent is configured to execute the trained machine learning models and provide an input to the trained machine learning models in the form of detected data, i.e. data monitored or observed by the node agent being representative of the at least one local observable and/or the performance characteristics for data inflow to a data transmission port and based on the detected data. Based on this input the trained machine learning models, when executed by the node agent, provide as output settings for, i.e. instructions for when and how to change, the local policy matrix. This allows the node agent to use the output of the one or more trained machine learning models to detect if, when and how to change and/or update the local policy matrix to make the network perform in accordance with global targets defined and used throughout the process of training the machine learning models. These targets will be described in more detail below.

Thus, the node agent control data comprises the one or more trained machine learning models which are used by the node control agent to detect when to change and/or update the local policy matrix and to determine what one or more changes and/or updates to be performed. Accordingly, the node agent is configured to update the local policy matrix of the communication controller based on observations of the at least one local observable and/or the performance characteristics by means of using the one or more trained machine learning models as described above.

In case the node agent control data comprises a plurality of trained machine learning models the node agent can be configured to perform a selection process to select a trained machine learning model from the plurality of machine learning models. The selection process can for example be configured to cause a selection of a trained machine learning model having been predetermined to provide best average traffic performance characteristics when the value of the at least one local observable lies within a certain predetermined range or when the individual values of a set of local observables each lies within certain ranges. A single machine learning model may also be comprised of a combination of a plurality of machine learning models.

Figure 9:
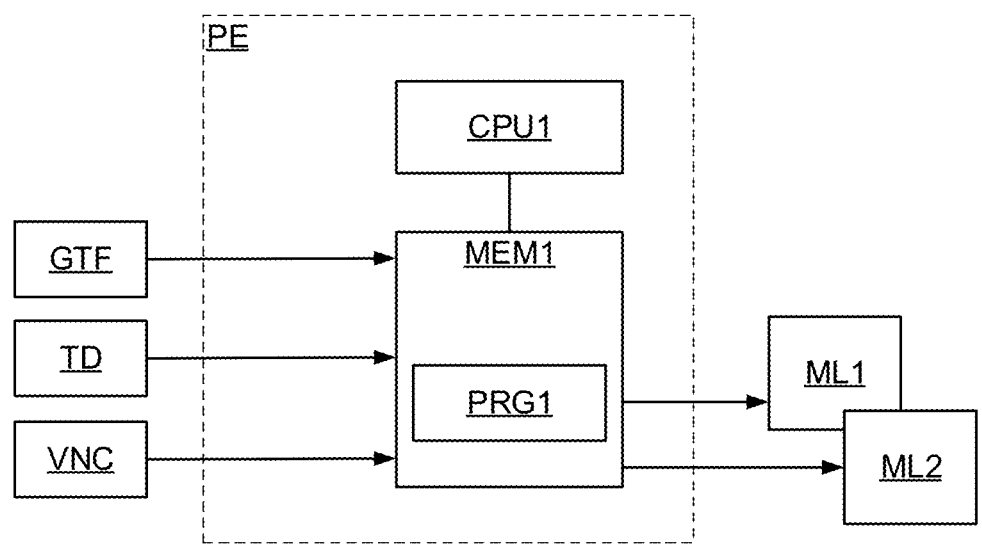
FIG. 9 is a block diagram of a processing environment.

The generation of the node agent control data, i.e. training of the machine learning models, is configured to be performed off-line for example in a data processing environment such as a server environment disconnected from the network, such as in a data processing environment PE as described with reference to FIG. 9. The generated node control data, i.e. the trained machine learning models, is configured to be used by the node agent on-line, i.e. configured to be used by the node agent when being present in the network and when the network is operated, as part of the communication controller.

Figure 4:
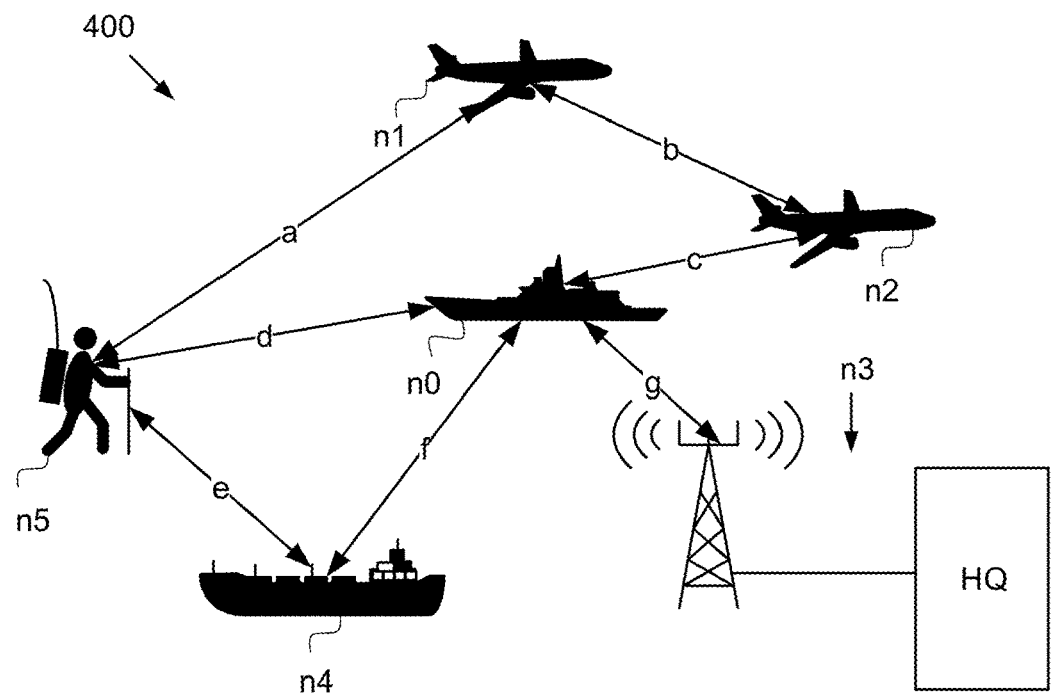
FIG. 4 is a schematic diagram of an exemplary communication network.

To train the one or more machine learning models a virtual network clone, such as a virtual network clone corresponding to a virtual representation of as network, such as the network 400 as described with reference to FIG. 4, is generated. The virtual network clone is a virtual representation of the network, i.e. a virtual representation of the components of the network. The purpose of the virtual network clone is to allow training of the machine learning models without the need for having access to the physical network. This also allows having a data processing capacity exceeding that of the nodes of the network which is very useful for the purpose of the training of the machine learning models.

To create the virtual network clone hardware comprised in the network, i.e. in the actual physical network, such as nodes with associated equipment and information such as communication controllers, node processing equipment and communication links is transformed by being modelled into software and/or hardware emulators. Also wireless communication channels may be modelled into software. The software comprised in the network and information associated thereto, such as the applications configured to be executed by the nodes, may be used directly as virtual clones of the software of the network or ported, if necessary, for execution in the data processing environment disconnected from the network. The process of generating the virtual network clone can be facilitated by means of the trend of increased use of software defined networking/software defined radio which means the need for emulating hardware components is reduced.

Accordingly, the one or more machine learning models are trained by means of the one or more machine learning algorithms being executed in a data processing environment together with executing the virtual network clone while providing training data. The data processing environment is described in more detail with reference to FIG. 9.

The training data is data, such as data sets, representative of values of the at least one local observable over a period of time for various scenarios. The training data may be generated semi-automatically based on knowledge of how the at least one local observable typically varies for the various scenarios and/or may be generated automatically by means of recording variations of the at least one local observable, in the network, i.e. in the physical network, once operated, by means of attaching one more recording device to the network.

In case the inventive concept described throughout this application is applied to networks in the military field information from concept of operations (CONOPS) documentation can be used to facilitate generating training data. Typically, CONOPS documentation is required to be produced and made available for military systems. The CONOPS documentation describes characteristics of a system such as a network and resources associated thereto from the viewpoint of an individual who will use that system. It is used to communicate the quantitative and qualitative system characteristics to all stakeholders, i.e. to all users such as soldiers having various roles/assignments and commanders. Accordingly, the CONOPS documentation can be used to facilitate training of the machine learning models by means of providing information about how the network is configured and how it is intended to be used. This can for example provide information relating to predicting data traffic patterns that are likely to appear in the network. This type of information is typically not available for other types of larger scale networks such as commercial networks where the actual use will be far less predictive than for the military network. Accordingly, CONOPS documentation facilitates generating the training data.

The one or more machine learning algorithms are each configured to, once executed, to search for local optimizations, i.e. optimizations of the local policy matrix in terms of performance characteristics as a function of different values of the at least one local observable while satisfying a global target function which will be defined in more detail below.

As explained above the training process of the machine learning models i.e. execution of the machine learning algorithms is performed in the processing environment disconnected from the physical network wherein the physical network comprising, nodes its associated hardware and software, such as, applications, communication controllers, node agents and intermediaries, i.e. communication channels, interconnecting the nodes are replaced by a virtual clones. Thus, the virtual network clone comprises virtual application clones, virtual communication controller clones, virtual node agent clones and virtual communication channel clones. The virtual application clones can be a direct copy of the applications to be deployed in the physical network.

At least one machine learning algorithm is configured for each virtual node agent clone for which its physical counterpart, i.e. node agent to be used in the physical network, is intended to be configured with control functionality based on the at least one trained machine learning models. Thus, even though all node agents are cloned it is not required that all cloned node agents are associated with at least one machine learning algorithm. This allows providing a network with node agents where some node agents performs control of its associated local policy matrix based on using trained machine learning models and wherein some other node agents can be configured by traditional rule based means.

Once executed, i.e. when training the machine learning models in the processing environment, each machine learning algorithm is configured to generate at least one machine learning model which when trained, results in that the control performed by all virtual node agents based on the respective associated trained machine learning models, when executed as part of the virtual network clone, causing satisfaction of a global target function. Thus, the training of the machine learning models is performed based on executing the machine learning algorithms together with the virtual network clone whilst providing training data, time and/or event based variations of the at least one local observable and/or performance characteristics, causing generation of the machine learning models that are trained by continuously and jointly evaluating the control performed by each virtual node agent based on its respective machine learning model against the global target function. This results in that when the trained machine learning models are deployed to and used by the node agent of the physical network that the node agents update the local policy matrix based on variations of the least one local observable and/or variations of performance characteristics such that the global target function is satisfied also for the physical network, i.e. the local control performed by all node agents of the physical network results in satisfying the global target function. The global target function or portions thereof may also be defined by means of threshold values or threshold parameters, this will be described in more detail below.

The global target function comprises Quality of Service targets for all individual applications associated with a respective communication controller of the network. The targets of the global target function may for example relate to overall performance characteristics, such as performance characteristics relevant for a large number of applications of several communications controllers of the network. These targets can also relate to specific important performance characteristics relevant for only a few applications. Targets of the global target function comprise end to end performance metric such as bandwidth and end to end latency between the applications of the communication controllers. In more detail the targets of the global target function comprise end to end application performance metrics. The end to end application performance metric (Quality of Service, (QoS)) is a measure of performance of the individual application in terms of performance for one or more data flows generated by the application and provided to and received by one or more different applications.

As an example, consider a voice communication application being operated, i.e. executed and used, in a node such as in a node of a network, such as in node n5 of a network 400 described with reference to FIG. 4 to allow an operator of the node n5 to communicate with a user of voice communication application of a different node, such as node n3 of the network 400 described with reference to FIG. 4 then the performance metrics of interest in terms of latency is not related to which nodes of the network that data flow associated with the voice communication passes through and what latency is introduced by the one or more individual respective passed nodes instead it is the latency, i.e. time that passes, from the point in time when a user of the voice communication application of the node n3 utters a word using the voice communication application until the point in time when a user of the of the voice communication application of the node n5 perceives that word. Accordingly, this is an example of application end to end performance metrics.

Thus, global target function define targets for end to end application performance metrics in terms of performance metrics for providing data to or from the corresponding applications of the communication controller via its data transmission port and the application port from or to corresponding applications of at least one different communication controller via its data transmission port and the application port and via any intermediaries such as communication channels present and used for data provision between the two different communication controllers.

Thus, once executed, each machine learning algorithm each being associated with an individual virtual node agent clone can operate independently from machine learning algorithms associated with other virtual node agent clones to cause generation of the at least one machine learning model as long as all of the resultant outputted at least one machine learning model for all virtual node agents which when used by the associated node virtual agent do not cause the associated node agent to perform updates of the local policy matrix causing that the targets defined by the global target function are not satisfied. The global target function may also be configured to define one or more thresholds for at least one of the targets so that smaller exceedances/overshoots can be tolerated. The targets of the global target function may also be defined as dynamical or targets meaning that the targets can vary as a function of one or more parameter such vary over time and/or vary as a function of the at least one local observable and/or the observed performance characteristics.

As described above the process of training the at least one machine learning model could be seen as being based on individual training, i.e. based on individually training each machine learning model associated with each virtual node agent clone corresponding to the node agents to be present in the actual physical network and configured to assert control by the at least one trained machine learning model. However, by means of continuously jointly evaluating all machine learning models against the targets of the global target function the training process becomes collective. Thus, the process of training the machine learning models is based on collective training process. This means that individual machine learning models or the machine learning algorithms used for the generation thereof do not require knowledge about the configuration of other machine learning models but in order for the machine learning models to be qualified for deployment into node agents of the physical network all machine learning models of all virtual node agent nodes when executed in the virtual network clone whilst being provided with training data are required to cause updates of each respective local policy matrix so that the global target function is fulfilled, i.e. so that no targets of the global target function dissatisfied. Accordingly, during training of the machine learning models the machine learning models the resultant control of the local policy matrixes based on the machine learning models, iteratively generated during training, are jointly and continuously evaluated against the global target function to ensure acceptable performance of the machine learning models once deployed into the node agents of the network.

Once the training phase is complete, i.e. when the execution of the machine learning algorithms is completed to satisfaction for example following a validation process giving acceptable results for the outputted trained machine learning models the machine learning models are ready to be deployed into the respective node agents of the actual physical network.

In the processing environment, i.e. training environment, in which the machine learning models are trained, by means of execution of the machine learning algorithms together with the virtual network clone and the global target function whilst providing training data the global target function can be evaluated in real time since any performance metric is including end to end applications performance is available. This can for example be achieved by using a performance monitoring function which once executed in the processing environment monitors any type of performance metrics distributed and accessible in the network clone. The performance monitoring function can for example be part of instructions, such as the second instructions PRG1 being stored in the second memory of the processing environment as described with reference to FIG. 9. This is not possible during operation in a deployed network, i.e. when the network is operated, since node agents only have access to limited end to end application performance metrics due to bandwidth and/or latency influences.

According to an alternative example the off-line training of the machine learning models, i.e. training in a virtual environment can be complemented by means of on-line training also referred to as reinforced learning or training. In this case the trained machine learning models are configured to continue to be trained after having been deployed into the node agents of the physical network. This type of training can be used to further improve the trained machine learning models. This type of training may be limited as compared to off-line training depending on the amount of processing capacity being made available to the node agents.

FIG. 4 discloses a communication network 400 comprising a main node n0, a first node n1, a second node n2, a third node n3 which is a headquarter HQ with means for mission control. The communication network 400 further comprises a fourth node n4 and a fifth node n5.

Between the nodes different communication channels exists. Node n1 has bidirectional connections to node n2 via connection b, and to node n5 via connection a. A short hand notation is introduced in order to describe the connections between nodes, where n1-$b$-n2 discloses a connection between node n1 and n2 via connection b. This allows us to define the communication paths in the communication network 400 as: n1-$b$-n2, n1-$a$-n5, n5-$d$-n0, n5-$e$-n4, n4-$f$-n0, n0-$g$-n3, and n0-$c$-n2. Some of the nodes in the communication network 400 are mobile n0, n1, n2, n4 and n5. This means that the topology of the communication network 400 may change over time and an update of the corresponding routing table is necessary.

It should be noted that the network 400 may be configured in a different as compared to the network illustrated in FIG. 4, for example the network may comprise additional nodes and communications channels such as wired and/or wireless communication channels.

Figure 5:
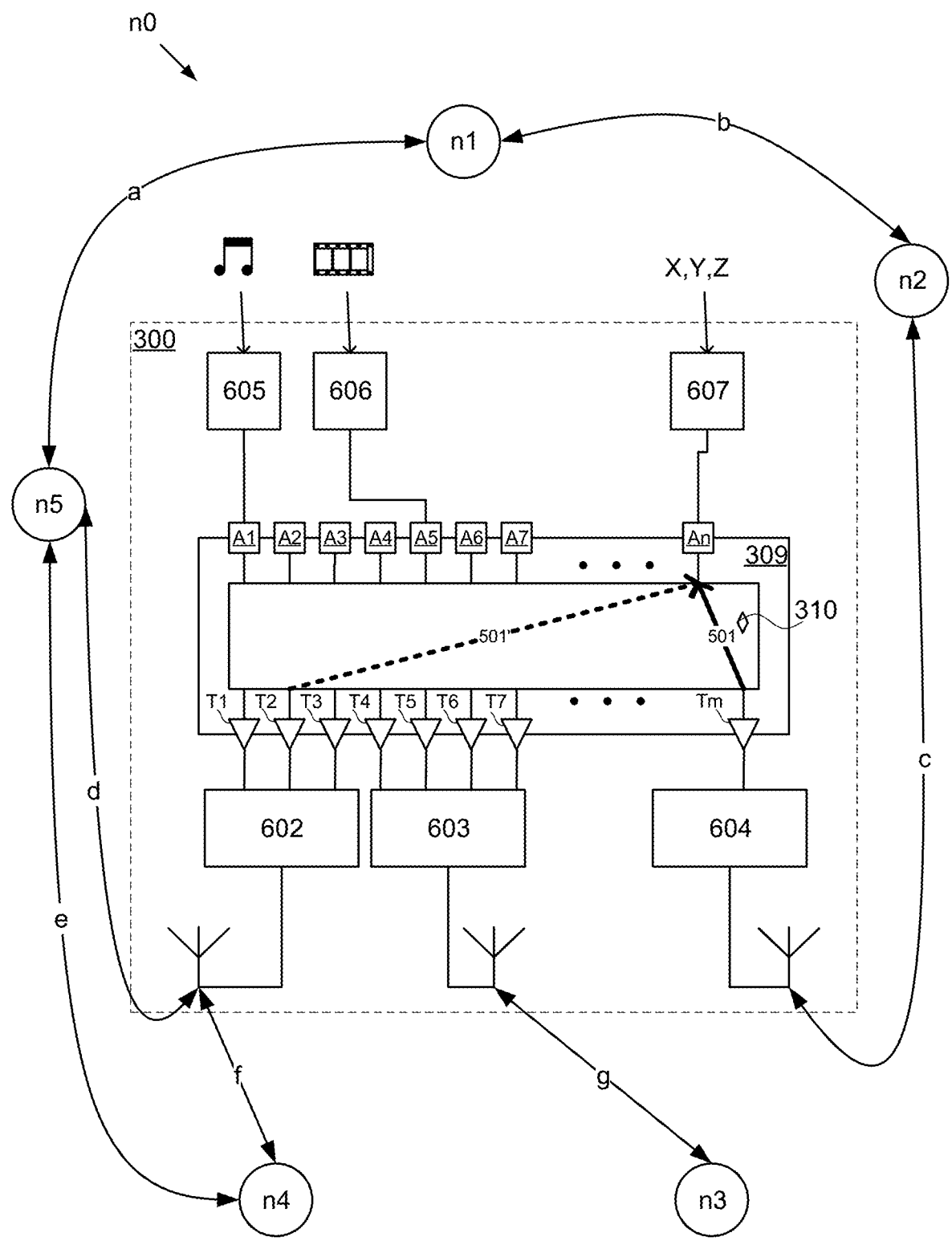
FIG. 5 is a schematic diagram of a communication system according to an embodiment of the present invention in the exemplary communication network.

An embodiment of the communication system 300 according to the present invention will now be discussed with reference made to FIG. 5. In FIG. 5 the communication network 400 of FIG. 4 is used, and the main node n0 comprises a communication system 300 as described above with reference made to FIG. 3. The first radio transceiver 602 is a transceiver that provides normal bandwidth and normal delay. This radio transceiver may be suitable for voice communication. The second radio transceiver provides a high bandwidth and high delay, a common situation for a normal video link. Finally, the third radio transceiver provides low bandwidth and low delay, which may be suitable for use with telemetry data. As an example assume that the first node n1 sends telemetry data to the main node n0 via the second node n2, which according to the above introduced notation will be n1-$b$-n2, n0-$c$-n2. In the main node the node agent 310 has assigned a connection 501 from the data transmission port Tm to the application port An of the communication controller. If the connection c is jammed the stream of telemetry data from the first node n1 to the main node n0 will be interrupted. In this case the node agent 310 decides that application port An will use data transmission port T2 instead of Tm causing a connection 501', with the penalty that the telemetry stream will be delayed, but the node agent decides that it is better to send delayed telemetry data than sending nothing. The above situation with jamming of connection c may also be resolved by means of re-routing in some scenarios.

If the communication network 400 comprises several nodes with communication controllers according to above embodiments it is easy to understand the importance of a common training of the expert system in the corresponding node agents. This will assure that a common and predictable behaviour of the node agents are achieved. FIG. 6 discloses a star diagram, representative of the global target function, generally designated 600, the star diagram has a plurality of axes 602-605, wherein each axis corresponds to a communication characteristic such as bandwidth, delay, and packet drops as examples. A specific application has an application profile illustrated as a polygon 606. Another application has another application profile illustrated as a polygon 607. The node policy is essentially a list of applications and their desired communication characteristics such as QoS etc. Assume that in the example of FIG. 4 all of the nodes have communication controllers 309 according to embodiments of the invention, some nodes may have the same node policy, for example the first node n1 and the second node n2, but other nodes such as the third node n3 and the fifth node n5 will most likely have different node policies. In each node of the communication network, the node agent of the communication controller updates a local policy matrix with rows that indicates inflows and outflows, and columns that indicate data transmission ports T1-Tm. The node agent updates the local policy matrix based on the at least one local observable FIG. 7 discloses a flow diagram for a method for controlling a communication controller according to embodiments of the present invention. The method comprising:

S1: Monitoring performance characteristics for data inflow to a data transmission port.

S2: Monitoring at least one local observable.

S3: Controlling the connection between a data transmission port and another data transmission port causing outflow of data; or an application port, causing inflow of data if the application port receives data, and outflow of data if the application port sends data based on the monitored performance characteristics and the at least one local observable and at least one trained machine learning model and a local policy matrix;

The method disclosed above may be performed by a computer (CP), see FIG. 8, having a first processor (CPU) and a first memory (MEM), wherein the first memory comprises first instructions (PRG) such that when executed by the processor the above method (S1-S3) is executed.

Preferably, the method, described with reference to FIG. 7, comprises an additional step in the form of training at least one machine learning model. The training of the machine learning models, described in more detail with reference to FIG. 3 is preferably performed before performing the method steps S1-S3. In more detail the training of the machine learning models is performed using a processing environment PE, see FIG. 9. The processing environment PE comprises at least one second processor CPU1 and at least one second memory MEM1, wherein the second memory comprises second instructions PRG1 which once executed while providing input data to the processing environment, in the form of a virtual network clone VNC, training data TD and a global target function GTF, causes generation of at least one machine learning model such as a first ML1 and a second ML2 machine learning model. The input to the data processing environment further comprises at least one machine learning algorithm configured for when executed to generate the at least one machine learning model. The processing environment is also, as described above, arranged to execute a monitoring function to enable evaluation of the global target function. The monitoring function may be arranged to be stored in a dedicated memory and executed by a dedicated processor (not shown) so as not to affect the processing of the virtual network clone. The processing environment is a processing environment disconnected from the network, such as the network 400 described with reference to FIG. 4, comprising the at least one node agent into which the at least one generated machine learning models is to be deployed. The processing environment can for example be a server environment, a cloud environment or a combination thereof in order to provide required processing capacity.

Modifications and Variations

Many modifications and variations can be made to the embodiments described above.

One modification is to use the communication controller disclosed in embodiments above as a relay controller in this modification no application ports A1-An are used, only data transmission ports T1-Tn are used together with the data transmission system 301.

The foregoing description of embodiments of the invention has been presented for the purpose of illustration and description. It is not intended to be exhaustive or to limit the invention to the precise form disclosed. Alternations, modifications and variations can be made without departing from the spirit and scope of the present invention.

The invention claimed is:

1. A centralized communication controller of a node in a network, the centralized communication controller consisting of:
   a plurality of data transmission ports configured to be connected to corresponding logical channels;
   a plurality of application ports configured to provide data to or from corresponding applications; and
   a single node agent having node control data comprising at least one trained machine learning model, the single node agent being configured to:
   monitor performance characteristics for data inflow to the plurality of data transmission ports;
   monitor at least one local observable;
   control a connection between either: (i) two or more of the plurality of data transmission ports causing inflow or outflow of data, or (ii) between one or more of the plurality of data transmission ports and one or more of the plurality of application ports, causing (a) inflow of data if the one or more of the plurality of application ports receives data, and (b) outflow of data if the one or more of the plurality of application ports sends data; and
   control a connection between either: (i) the two or more of the plurality of data transmission ports, or (ii) between the one or more of the plurality of data transmission ports and the one or more of the plurality of application ports based on the monitored performance characteristics, the at least one local observable, the at least one trained machine learning model, and a local policy matrix,
   wherein:
   the local policy matrix is updated based on variations of the at least one local observable derived from at least one of an inflow of data to the centralized communication controller or variations of the performance characteristics such that a global target function defining end to end application performance metrics for providing data to or from the corresponding applications of the centralized communication controller via the plurality of data transmission ports is satisfied for a local control performed by the single node agent, and the update of the local policy matrix comprises automatically updating the local policy matrix based on providing at least one of results from the monitoring of the at least one local observable or the performance characteristics into the at least one trained machine learning model, whereby an output of the at least one trained machine learning model is generated by the single node agent which is used by the single node agent to update the local policy matrix.

2. The centralized communication controller according to claim 1, wherein the at least one local observable is at least one from the group:
node permission change;
net topology change;
link quality change;
node congestion change;
traffic pattern change;
jamming and cyber-attacks;
information from all levels of network layers and OSI-layers;
physical sensor data; and
instructions from operators and/or applications.

3. The centralized communication controller according to claim 1, wherein the at least one trained machine learning model is trained off-line in a data processing environment disconnected from a network comprising the centralized communication controller.

4. The centralized communication controller according to claim 3, wherein:
the at least one trained machine learning model is trained off-line based on using at least one machine learning algorithm, training data for the machine learning algorithm and a virtual network clone, and
said virtual network clone is a software and/or emulated representation of the network.

5. The centralized communication controller according to claim 4, wherein:
the training of the at least one machine learning model further is based on the use of the global target function defining targets for end to end application performance metrics in terms of performance for providing data to or from the corresponding applications of the centralized communication controller via the plurality of data transmission ports, and
the plurality of application ports from or to corresponding applications of at least one different communication controller via its plurality of data transmission ports and its plurality of application ports and via any intermediaries.

6. A method for controlling a centralized communication controller of a node in a network,
the centralized communication controller consisting of:
a plurality of data transmission ports configured to be connected to corresponding logical channel;
a plurality of application ports configured to provide data to or from corresponding applications; and
a single node agent comprising a hybrid intelligent system;
the method comprising:

monitoring performance characteristics for data inflow to the plurality of data transmission ports;
monitoring an at least one local observable; and
controlling a connection between either: (i) two or more of the plurality of data transmission ports causing inflow or outflow of data, or (ii) between one or more of the plurality of data transmission ports and one or more of the plurality of application ports, (a) causing inflow of data if the one or more of the plurality of application ports receives data, and (b) outflow of data if the one or more of the plurality of application ports sends data,
wherein:
the controlling is based on the monitored performance characteristics, the at least one local observable, the at least one trained machine learning model, and a local policy matrix,
the control of the connection is performed by the hybrid intelligent system having node control data comprising at least one trained machine learning model,
the hybrid intelligent system updates the local policy matrix based on variations of the at least one local observable derived from at least one of an inflow of data to the centralized communication controller or variations of the performance characteristics, such that a global target function defining end to end application performance metrics for providing data to or from the corresponding applications of the centralized communication controller via the plurality of data transmission ports is satisfied for a local control performed by the hybrid intelligent system, and
the monitored at least one local observable or the monitored performance characteristics is used as input to the at least one trained machine learning model so as to perform said controlling of the connection by means of automatically updating the local policy matrix by using an output from the at least one trained machine learning model generated by the hybrid intelligent system.

7. The method according to claim 6, wherein the monitoring of the at least one local observable comprises monitoring at least one from the group:
node permission change;
net topology change;
link quality change;
node congestion change;
traffic pattern change;
jamming and cyber-attacks;
information from all levels of network layers and OSI-layers;
physical sensor data; and
instructions from operators and/or applications.

8. The method according to claim 6, further comprising the step of:
generating the at least one trained machine learning model, used for controlling the connections, by means of providing at least one machine learning algorithm, a virtual network clone, the global target function and training data to a processing environment, and executing the at least one machine learning algorithm, the virtual network clone and the global target function in the processing environment while providing the training data so as to cause the at least one machine learning algorithm generating the at least one trained machine learning model.

9. A computer program for controlling the centralized communication controller, comprising instructions which, when executed on at least one processor, cause the at least one processor to carry out the method according to claim 6.

10. A non-transitory computer-readable storage medium storing a computer program for controlling the centralized communication controller according to the method of claim 6.

11. The centralized communication controller according to claim 1, wherein the update of the local policy matrix comprises modifying a designated priority corresponding with at least one of a plurality of data types.

12. The centralized communication controller according to claim 1, wherein the at least one local observable comprises at least one of weather information or Radio-Frequency environment information corresponding with a location of at least one node within a physical network corresponding with the centralized communication controller.

13. The centralized communication controller according to claim 1, wherein the single node agent is configured to cause selection of the at least one trained machine learning model having been predetermined to provide average traffic performance characteristics when a value of the at least one local observable lies within a certain predetermined range or when individual values of a set of local observables each lie within certain ranges.

14. The centralized communication controller according to claim 4, wherein the training data is generated automatically by means of recording variations of the at least one local observable in a physical network corresponding with the centralized communication controller.

15. The method according to claim 6, wherein the update of the local policy matrix comprises modifying a designated priority corresponding with at least one of a plurality of data types.

16. The method according to claim 6, further comprising the step of causing selection of the at least one trained machine learning model having been predetermined to provide average traffic performance characteristics when a value of the at least one local observable lies within a certain predetermined range or when individual values of a set of local observables each lie within certain ranges.

17. The method according to claim 8, further comprising the step of automatically generating the training data by means of recording variations of the at least one local observable in a physical network corresponding with the centralized communication controller.

* * * * *